(12) United States Patent
Samra et al.

(10) Patent No.: US 6,889,314 B2
(45) Date of Patent: May 3, 2005

(54) METHOD AND APPARATUS FOR FAST DEPENDENCY COORDINATE MATCHING

(75) Inventors: Nicholas G. Samra, Austin, TX (US); Murali S. Chinnakonda, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 509 days.

(21) Appl. No.: 09/965,211

(22) Filed: Sep. 26, 2001

(65) Prior Publication Data

US 2003/0061466 A1 Mar. 27, 2003

(51) Int. Cl.$^7$ ................................................. G06F 9/52
(52) U.S. Cl. ........................................................ 712/216
(58) Field of Search ......................................... 712/216

(56) References Cited

U.S. PATENT DOCUMENTS

| | | | | |
|---|---|---|---|---|
| 5,710,902 A | * | 1/1998 | Sheaffer et al. ............. 712/216 |
| 5,787,287 A | | 7/1998 | Bharadwaj ................... 717/149 |
| 6,016,540 A | | 1/2000 | Zaidi et al. .................. 712/205 |
| 6,065,105 A | | 5/2000 | Zaidi et al. .................. 712/215 |
| 6,366,993 B1 | * | 4/2002 | Schrader ..................... 711/169 |
| 6,557,095 B1 | * | 4/2003 | Henstrom .................... 712/216 |

* cited by examiner

Primary Examiner—Eric Coleman
(74) Attorney, Agent, or Firm—Larry M. Mennemeier

(57) ABSTRACT

Disclosed herein is a method for matching dependency coordinates and an efficient apparatus for performing the dependency coordinate matching very quickly. A plurality of buffers to store instructions is set forth. Each storage location of a buffer corresponds to a particular pair of dependency coordinates. Dependency matching logic receives the dependency coordinates for a buffered instruction and scheduling information pertaining to dispatched instructions. The dependency matching logic indicates whether a dependency precludes scheduling of the corresponding buffered instruction. Dependency checking logic produces a ready signal for the buffered instruction when no such dependency is indicated by the dependency matching logic.

29 Claims, 12 Drawing Sheets

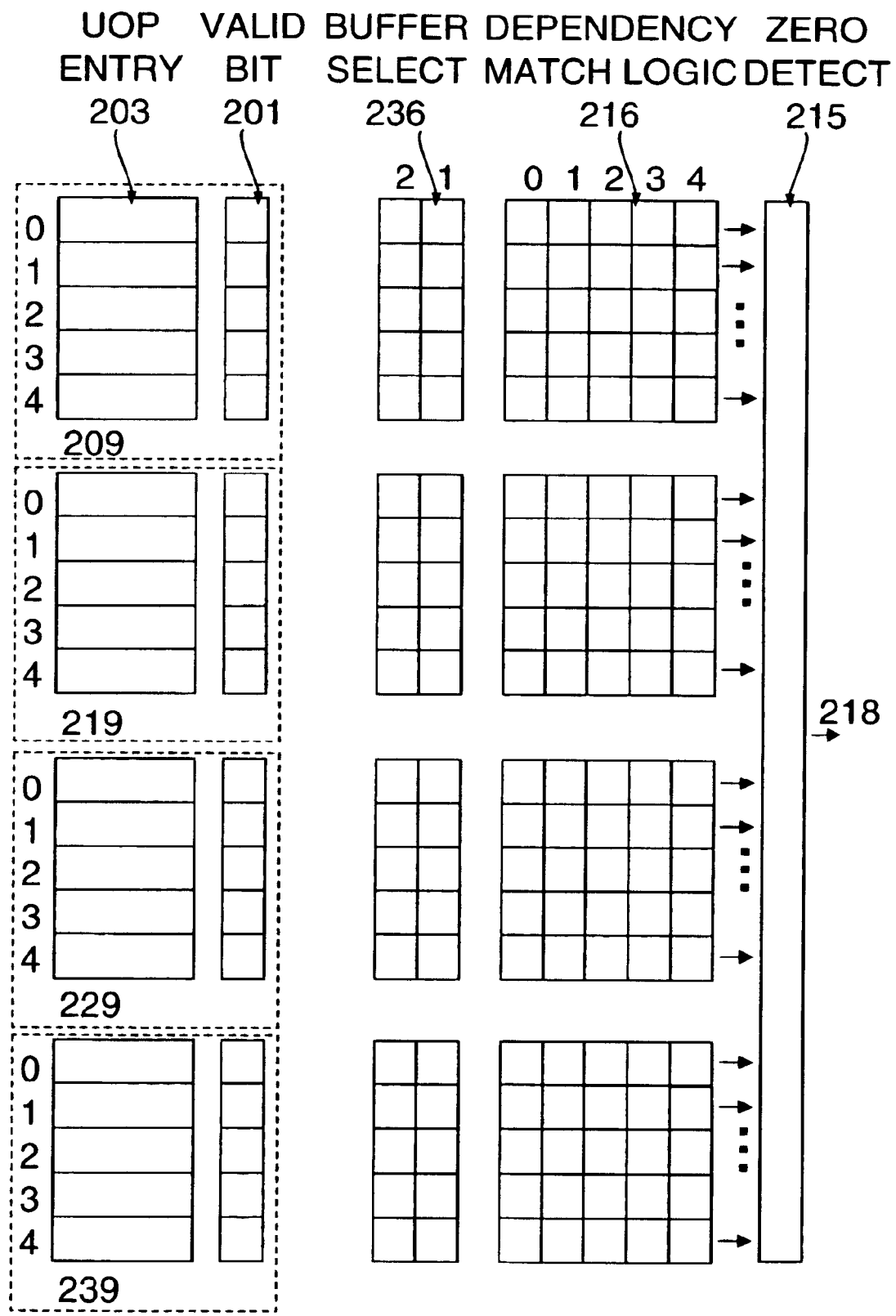

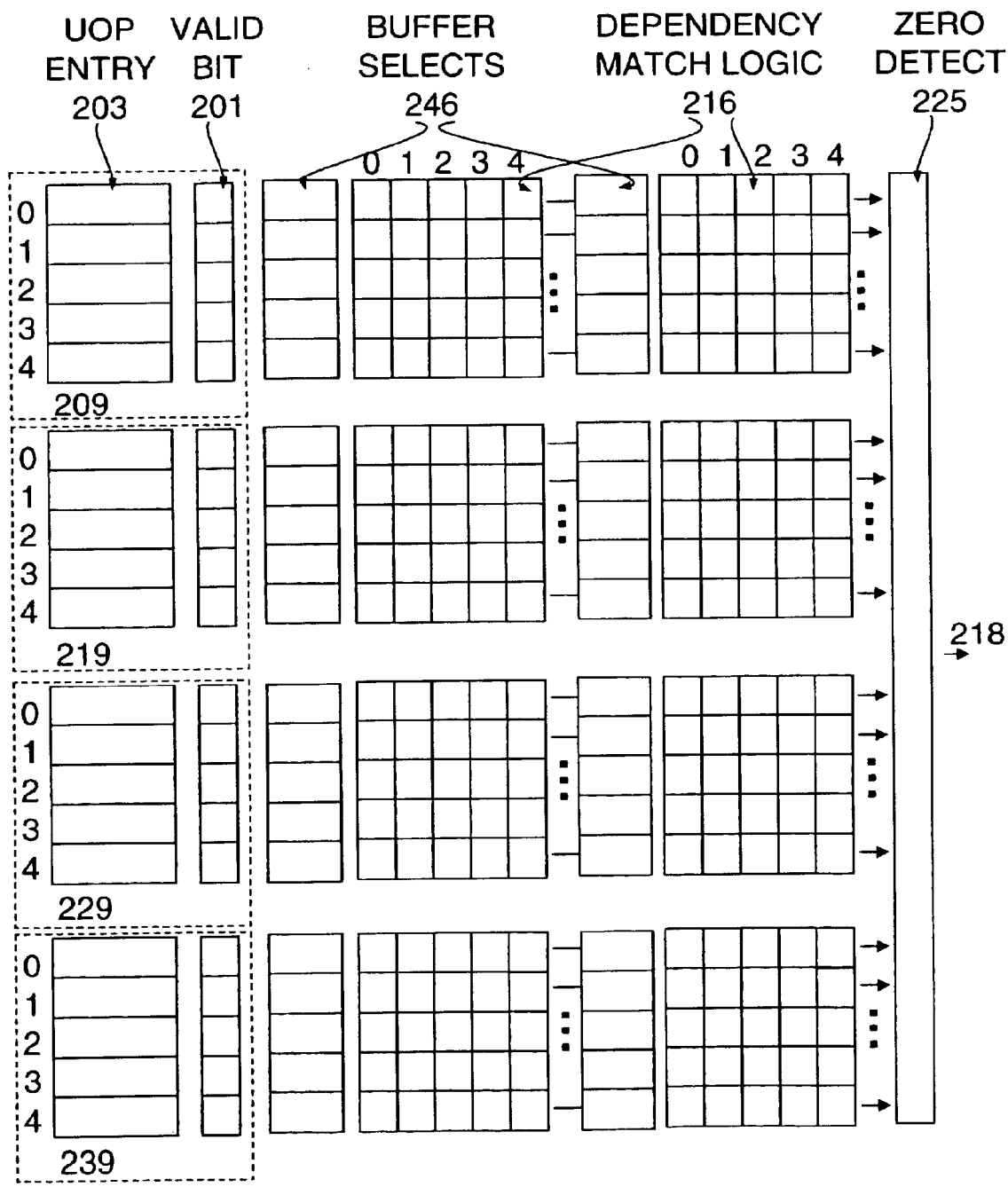

METHOD AND APPARATUS FOR FAST DEPENDENCY COORDINATE MATCHING

FIELD OF THE INVENTION

This invention relates generally to the field of computer systems, and in particular to matching instructions with corresponding source data dependencies.

BACKGROUND OF THE INVENTION

Computing systems use a variety of techniques to improve performance and throughput. One technique is known in the art as out-of-order (OOO) execution. In OOO execution, instructions are scheduled for execution in parallel and as soon as corresponding source data dependencies can be resolved, thereby increasing execution speed of the overall system.

One method of resolving source data dependencies is shown in FIG. 1 In a dependency matrix 106, dependency graph information is stored corresponding to an instruction to be executed. Each row of the matrix may be used to store dependency graph information for a corresponding instruction. The number of columns in the dependency matrix corresponds to the number of concurrently tracked instructions. Instructions stored in a buffer 109 include one or more micro-operations (UOP entry 103) and corresponding valid indicators (valid bit 101). For any particular instruction with dependency graph information stored in a row of dependency matrix 106, an entry in a column may be set to indicate a prior sequential instruction that produces source data required for its execution.

In order to identify relevant prior sequential instructions, the required sources may be compared against the destinations of all concurrently active instructions. If a dependency is found to exist, then a corresponding column may be used to record the source dependency. When an instruction (or micro-operation) is dispatched from the buffer a column in dependency matrix 106 corresponding to the dispatched instruction may be cleared. When all source dependencies are satisfied for an instruction, it may be dispatched for execution. Zero detect 105 detects when all bits in a dependency vector stored in a row of dependency matrix 106 have been cleared and produces signal 108 to identify the corresponding instruction (or micro-operation) as ready for scheduling. One limitation to this method is the number of comparators required for matching sources with destinations.

An alternative approach calls for tracking dependency information when sources and destinations are renamed. This alternative reduces the number of comparators required if instructions being dispatched are not dependent upon data produced by instructions concurrently being scheduled for execution. If such dependencies can exist, additional comparators may be required to determine when source data needs to be bypassed from one instruction to a subsequent instruction during execution, without waiting for the data to be written into its intended destination. Permitting such data to be bypassed potentially benefits execution speed, but identification of the relevant dependency may delay the dispatch of instructions.

For machines that employ wide superscalar execution of instructions, the number of column entries in a dependency matrix may be very large, and therefore corresponding circuitry to check for dependencies in a row of the dependency matrix needs to be increased accordingly. For the 16-entry buffer 109 depicted in FIG. 1, zero detect 105 may comprise a 16-input NOR gate for each row of dependency matrix 106. As the size of buffer 109 is increased, both dependency matrix 106 and zero detect 105 increase with the square of the size of buffer 109. For example, an 80-entry buffer 109, may require an 80×80 storage array for dependency matrix 106 and a zero detect 105 having eighty 80-input NOR gates. Each 80-input NOR gate, comprising five to six levels of logic, may become too slow to efficiently signal for the dispatch of new instructions (or micro-operations). Therefore, a new method of matching dependencies and dispatching instructions is called for.

BRIEF DESCRIPTION OF THE DRAWINGS

The present invention is illustrated by way of example and not limitation in the figures of the accompanying drawings.

FIG. 2b illustrates an alternative embodiment of a system that uses dependency coordinate matching in accordance with the teachings of the present invention.

FIG. 2c illustrates another alternative embodiment of a system that uses dependency coordinate matching in accordance with the teachings of the present invention.

DETAILED DESCRIPTION

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims.

Disclosed herein is a method for matching dependency coordinates and an efficient apparatus for quickly performing the dependency coordinate matching. It will be appreciated that, while the method and apparatus are disclosed in the context of matching source data dependencies for the scheduling of instructions for OOO execution, they may be applied to the scheduling of anything with dependency requirements, for example dependent subtasks of a complex procedure or automated assembly of a product.

A plurality of buffers to store instructions is set forth. The buffers may be located in one or more devices. Each storage location of a buffer corresponds to particular set, for example a pair, of dependency coordinates. Dependency matching logic receives the dependency coordinates for a buffered instruction and scheduling information pertaining to dispatched instructions. The dependency matching logic indicates whether a dependency precludes scheduling of the corresponding buffered instruction. Dependency checking logic produces a ready signal for the buffered instruction when no such dependency is indicated by the dependency matching logic.

For the purpose of the following disclosure, instructions may be considered to include, but are not limited to one or more operations. Each operation may or may not depend on source data from one or more previous sequential operations. Instructions may comprise complex instructions or simple instructions or both. They may further comprise macro-instructions or micro-instructions or both. Instructions or operations discussed herein may also be considered to comprise emulation instructions, for example, to emulate the behavior of instructions from one instruction-set architecture with instructions from another instruction-set architecture. The methods herein disclosed may be understood, by one skilled in the art, to apply to any of these instruction types. Accordingly, distinctions between the terms "instruction" and "operation" are not necessary to an understanding of the invention and, therefore, these terms may be used interchangeably.

Likewise, distinctions between "dispatching an instruction" and "scheduling an instruction for execution" are not necessary to an understanding of the invention. Accordingly, these terms may be considered synonymous for the purpose of the following disclosure.

Figure 1:
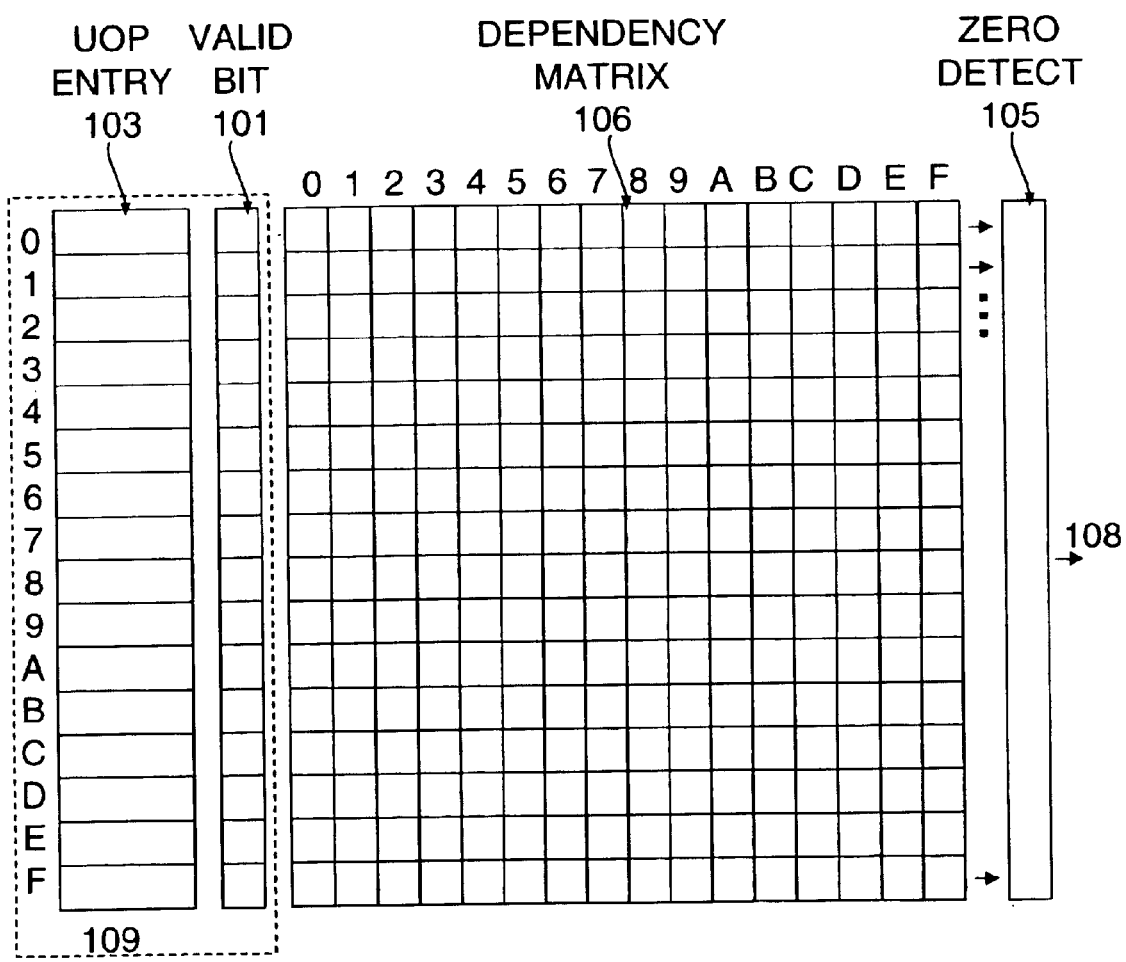
FIG. 1 illustrates a prior art system that uses a dependency matrix.
Figure 2A:
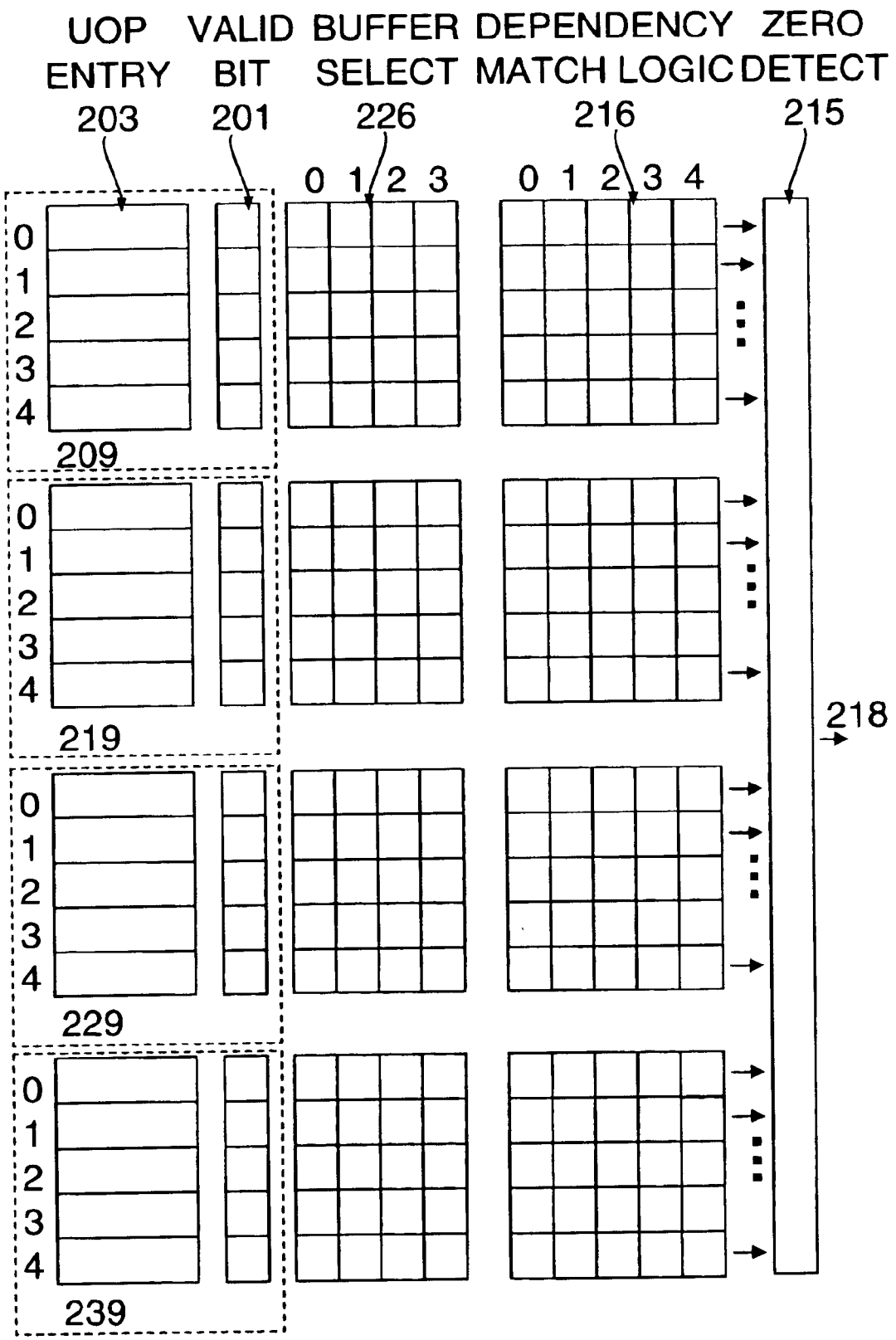
FIG. 2a illustrates one embodiment of a system that uses dependency coordinate matching in accordance with the teachings of the present invention.

FIG. 2a illustrates one embodiment of a 20-entry system that uses dependency coordinate matching. Instructions (or micro-operations) are stored in one of four buffers, buffer 209, buffer 219, buffer 229, or buffer 239. Buffers have five storage locations, each comprising an instruction (UOP entry 203) and a valid indication (valid bit 201). For each instruction stored there is a corresponding first dependency coordinate (buffer select 226) and a corresponding second dependency coordinate (dependency match logic 216).

According to the embodiment illustrated, dependency match logic 216 may store a decoded location coordinate having one of five bits set, and buffer select 226 may store a decoded buffer coordinate having one of four bits set. For example buffer select 226 may store a binary representation of 1000 to indicate buffer 209, a binary representation of 0100 to indicate buffer 219, a binary representation of 0010 to indicate buffer 229, and a binary representation of 0001 to indicate buffer 239. Dependency match logic 216 may, likewise, set one bit corresponding to the assigned location within the buffer that the instruction is stored. Interaction between buffer select 226 and dependency matching logic 216 are discussed in greater detail below with respect to FIG. 4a.

Dependency match logic 216 indicates whether a dependency precludes scheduling of the corresponding instruction (or micro-operation). Dependency checking logic (zero detect 215) produces signal 218 to identify the corresponding instruction (or micro-operation) as ready for scheduling when dependency match logic 216 does not indicate a dependency precluding scheduling.

It will be appreciated that the dependency coordinates may be conveniently chosen of various sizes suitable to the target system and that the storage requirements for dependency coordinates of the 20-entry system illustrated in FIG. 2a are nine storage elements per instruction rather than twenty storage elements per instruction as called for in a dependency matrix. It will also be appreciated by one skilled in the art that instructions may be assigned to buffers and corresponding coordinates according to a symmetric assignment scheme (e.g. randomly or sequentially), a functional assignment scheme (e.g. according to execution resources or instruction types) or a hierarchical assignment scheme (e.g. according to priorities, speculativeness, or importance).

FIG. 2b illustrates an alternative embodiment of a system that uses dependency coordinate matching. Again, instructions (or micro-operations) are stored in one of four buffers, buffer 209, buffer 219, buffer 229, or buffer 239, and buffers have five storage locations. For each instruction stored there is a corresponding first dependency coordinate (buffer select 236) and a corresponding second dependency coordinate (dependency match logic 216).

According to the embodiment illustrated, buffer select 236 may store an encoded buffer coordinate. For example buffer select 236 may store a binary representation of 00 to indicate buffer 209, a binary representation of 01 to indicate buffer 219, a binary representation of 10 to indicate buffer 229, and a binary representation of 11 to indicate buffer 239. Interaction between buffer select 236 and dependency matching logic 216 are discussed in greater detail below with respect to FIG. 4b.

It will be appreciated by one skilled in the art that an additional pair of dependency coordinates may be conveniently associated with each instruction without exceeding the number of storage elements called for in a dependency matrix. For example FIG. 2c illustrates another alternative embodiment of a system that uses dependency coordinate matching. As before, instructions (or micro-operations) are stored in one of four buffers, buffer 209, buffer 219, buffer 229, or buffer 239, and buffers have five storage locations. For each instruction stored there are two corresponding first dependency coordinates (buffer selects 246) and two corresponding second dependency coordinates (dependency match logic 216). Dependency checking logic (zero detect 225) produces signal 218 to identify the corresponding instruction (or micro-operation) as ready for scheduling when dependency match logic 216 does not indicate a dependency precluding scheduling. Interaction between buffer selects 246, dependency match logic 216 and dependency checking logic (zero detect 225) are discussed in greater detail below with respect to FIG. 5b.

According to the embodiment illustrated, two source data dependencies may be resolved for each instruction. It will be appreciated by one skilled in the art that a system may be extended to use as many pairs of dependency coordinates as are determined convenient.

Figure 3:
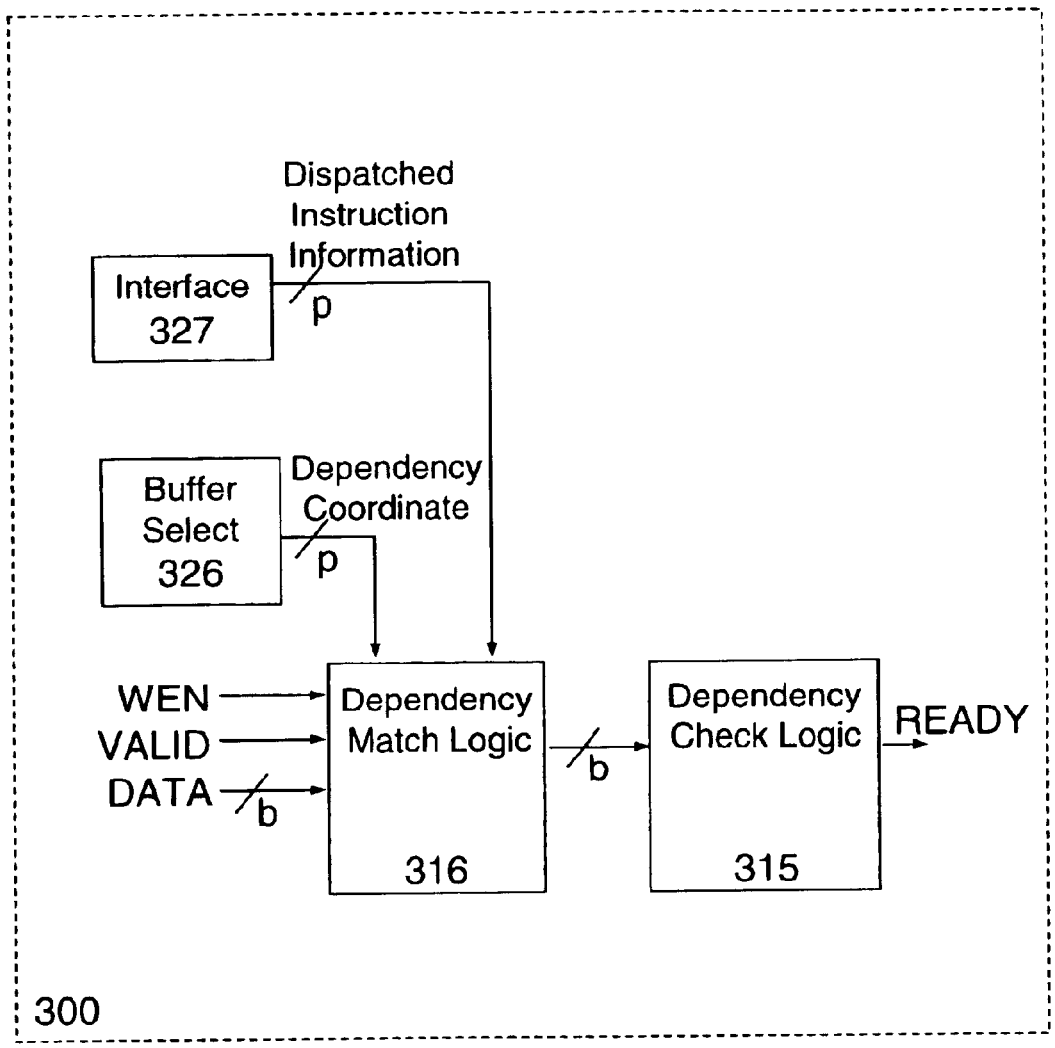
FIG. 3 illustrates one embodiment of an apparatus to check for dependencies and to signal when an instruction is ready for dispatch.

FIG. 3 illustrates one embodiment of an apparatus 300 to check for dependencies using dependency match logic 316 and dependency checking logic 315 and to signal when an instruction is ready for dispatch. Dependency match logic 316 receives, for a corresponding instruction, a p-bit dependency coordinate from buffer select 326 to indicate a source data dependency involving an instruction stored in a particular buffer and a b-bit dependency coordinate DATA to indicate which particular location within the buffer the instruction is stored. If the VALID signal and the WEN (write enable) signal are concurrently asserted as inputs to dependency match logic 316, then dependency match logic 316 may record the b-bit dependency coordinate DATA. When all of the recorded source data dependencies for this instruction have been cleared the instruction may be dispatched for execution.

Dependency match logic 316 may also receive p-bit scheduling information pertaining to dispatched instructions from interface 327. If the scheduling information matches the dependency coordinates, then the b-bit dependency coordinate DATA may be cleared. It will be appreciated that, the dependency coordinate data may be cleared in the same cycle that WEN is asserted, which may have otherwise required the use of extra bypass comparators.

It is the responsibility of dependency checking logic 315 to identify when all of the recorded source data dependencies for this instruction have been cleared. Dependency checking logic 315 receives a b-bit indicator of whether a dependency precludes scheduling of the corresponding instruction and produces a READY signal to identify the instruction for scheduling when no such dependency is indicated—following from the dispatch of all instructions producing the source data. It will be appreciated that the embodiment illustrated in FIG. 3 requires (p+b) storage elements whereas a dependency matrix uses (p×b) storage elements. It will also be appreciated that dependency checking logic 315 needs only to check the b bits of dependency match logic 316 rather than checking (p×b) bits of a dependency matrix.

Figure 4A:
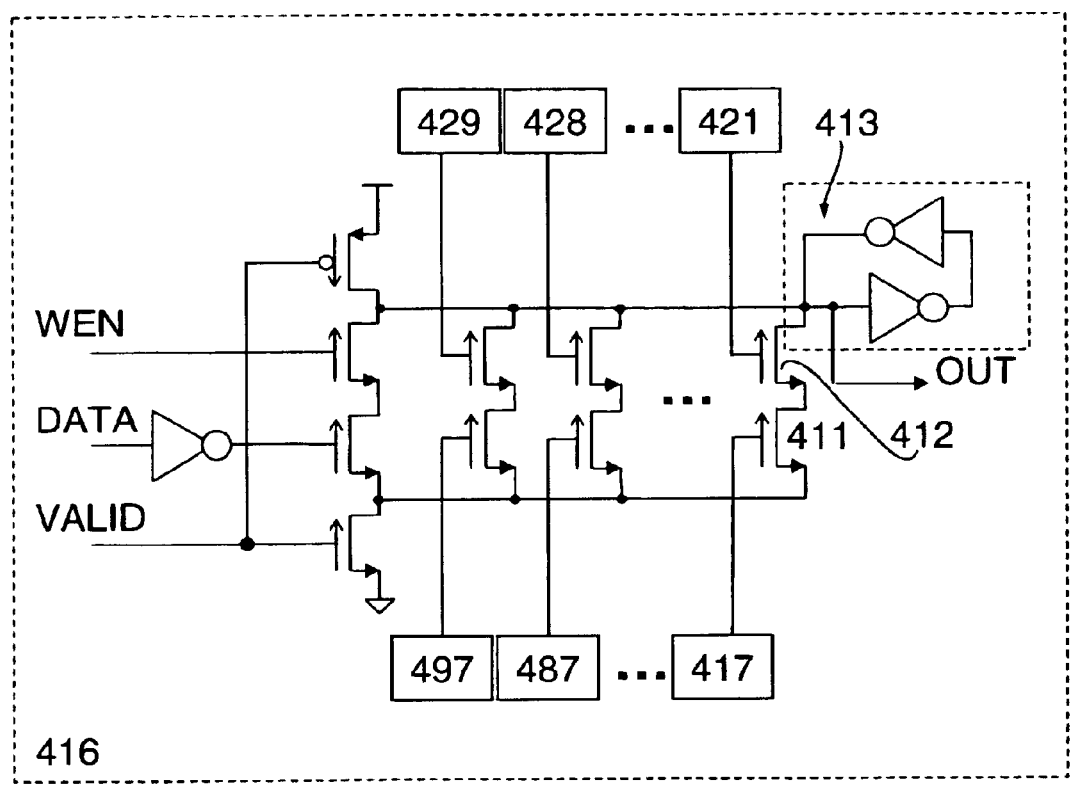
FIG. 4a illustrates one embodiment of a bit-slice of dependency matching logic using a decoded buffer select vector to record a dependency and to match scheduled instructions with dependencies.

FIG. 4a illustrates one embodiment of a bit-slice of the dependency matching logic using a decoded select vector to record a dependency and to match scheduled instructions with dependencies. Dependency match logic 416 receives, for a corresponding instruction, a dependency coordinate from buffer select bit 429, buffer select bit 428, . . . and buffer select bit 421. Dependency match logic 416 also receives one bit of a second dependency coordinate, DATA. If the VALID signal and the WEN (write enable) signal are concurrently asserted as inputs to dependency match logic 416, then dependency match logic 416 may record the one bit of the second dependency coordinate, DATA.

Dependency match logic 416 may also receive scheduling information interface bit 497, scheduling information interface bit 487, . . . and scheduling information interface bit 417 pertaining to dispatched instructions. For example, interface bit 497 may pertain to an instruction being dispatched from storage location number 4 in buffer 209, scheduling information interface bit 487 may pertain to an instruction being dispatched from storage location number 4 in buffer 219, . . . and scheduling information interface bit 417 may pertain to an instruction being dispatched from storage location number 4 in buffer 239. If an instruction stored in buffer 239 is indicated by buffer select bit 421, and the location associated with dependency match logic 416 is storage location number 4, then when an instruction is dispatched from the storage location number 4 in buffer 239, the signal received from scheduling information interface bit 417 is asserted at the input gate of device 411. If dependency match logic 416 has stored a set bit of the second dependency coordinate for an instruction in buffer 239, then buffer select bit 421 is asserted at the input gate of device 412, and so the data stored by storage element 413 is cleared, outputting a logic zero value at OUT. Thus, when the scheduling information matches the dependency coordinates, a recorded set bit of the second dependency coordinate, is cleared. Scheduling information is processed in a similar manner by devices with input gates coupled to receive from any of scheduling information bits 497, 487, . . . and 447.

When VALID is negated, storage element 413 is set. As was previously mentioned, the dependency coordinate data may be cleared in the same cycle that WEN is asserted without the use of extra bypass comparators when the scheduling information received matches the dependency coordinates.

Figure 4B:
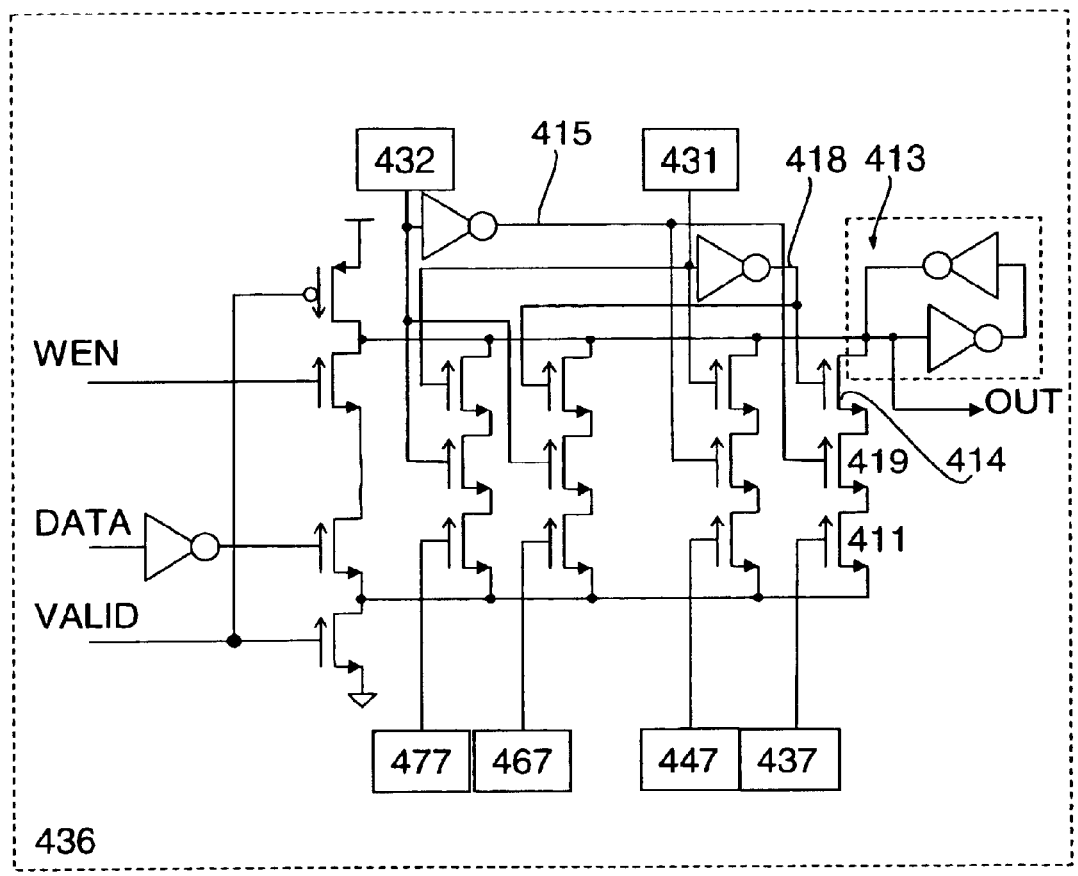
FIG. 4b illustrates an alternative embodiment of a bit-slice of dependency matching logic using a coded buffer select vector to record a dependency and to match scheduled instructions with dependencies.

FIG. 4b illustrates an alternative embodiment of a bit-slice of the dependency matching logic using a coded select vector to record a dependency and to match scheduled instructions with dependencies. Dependency match logic 436 receives, for a corresponding instruction, a dependency coordinate from buffer select bit 432 and buffer select bit 431. Dependency match logic 436 also receives one bit of a second dependency coordinate, DATA. If the VALID signal and the WEN (write enable) signal are concurrently asserted as inputs to dependency match logic 436, then dependency match logic 436 may record the one bit of the second dependency coordinate, DATA.

Dependency match logic 436 may also receive scheduling information. For example, the location associated with this dependency match logic 436 may be storage location number 2, and so scheduling information interface bit 477 may pertain to an instruction being dispatched from storage location number 2 in buffer 239, scheduling information interface bit 467 may pertain to an instruction being dispatched from storage location number 2 in buffer 229, . . . and scheduling information interface bit 437 may pertain to an instruction being dispatched from storage location number 2 in buffer 209.

If an instruction stored in buffer 209 is indicated by buffer select bit 432 having a logical value of zero and buffer select bit 431 having a logical value of zero, then when dependency match logic 436 has stored a set bit of the second dependency coordinate for an instruction in buffer 209 (corresponding to buffer select bits 432 and 431 having a value of 00) the signal line 418 is asserted high at the input gate of device 414 and signal line 415 is asserted high at the input gate of device 419. Whenever an instruction is dispatched from the storage location number 2 in buffer 209, the signal received from scheduling information interface bit 437 is asserted at the input gate of device 411. Therefore, the scheduling information matches the dependency coordinates, and the data stored by storage element 413 is cleared, outputting a logic zero value at OUT. Scheduling information is processed in a similar manner by devices with input gates coupled to receive from scheduling information bits 477, 467 and 447.

Figure 5A:
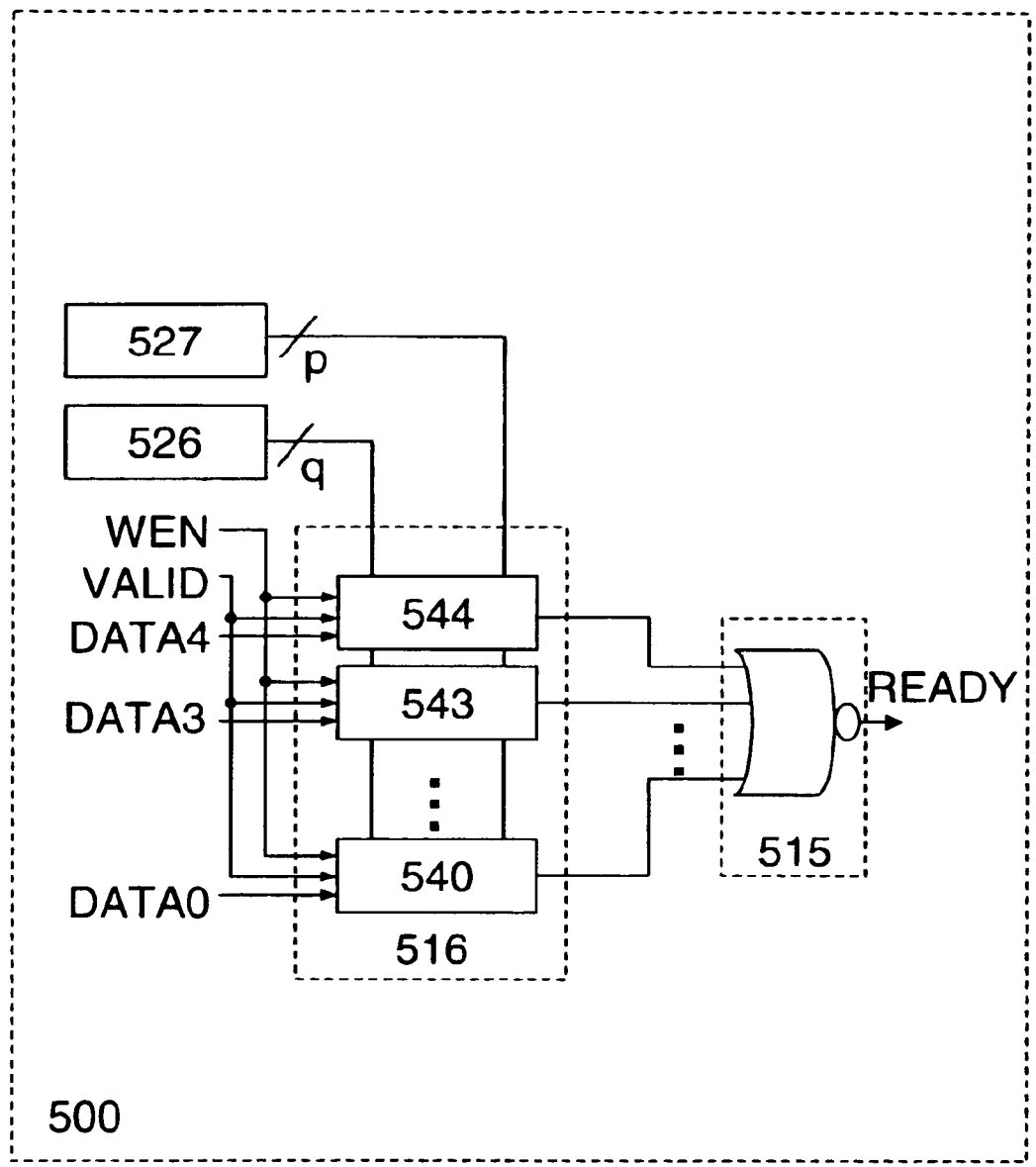
FIG. 5a illustrates one alternative embodiment of the apparatus to check for dependencies and to signal when an instruction is ready for dispatch.

FIG. 5a illustrates one alternative embodiment of an apparatus 500 to check for dependencies using dependency match logic 516 and dependency checking logic 515 and to signal by asserting READY when an instruction is ready for dispatch. Dependency match logic 516, comprising dependency match logic 544, 543, . . . and 540, receives, for a corresponding instruction, a first dependency coordinate comprising q bits from buffer select 526 and a second dependency coordinate comprising DATA4, DATA3, . . . and DATA0. If the VALID signal and the WEN (write enable) signal are concurrently asserted as inputs to dependency match logic 516, then dependency match logic 516 may record the second dependency coordinate comprising DATA4, DATA3, . . . and DATA0.

Dependency match logic 516 may also receive p-bit scheduling information pertaining to dispatched instructions from interface 527. If the scheduling information matches the dependency coordinates, then the second dependency coordinate comprising DATA4, DATA3, . . . and DATA0 is cleared. As noted above, the dependency coordinate data may be cleared in the same cycle that WEN is asserted.

Dependency checking logic 515 receives an indicator of whether a dependency precludes scheduling of the corresponding instruction and produces a READY signal to identify the instruction for scheduling when no such dependency is indicated. For example, dependency checking logic 515 may be realized by an NOR gate as shown. It will be appreciated that for an embodiment such as the one illustrated in FIG. 5a, dependency checking logic 515 may be conveniently sized to require less circuitry (thereby providing for area savings) and to require less logic levels (thereby providing for performance increases) than may be required for a similarly sized dependency matrix.

Figure 5B:
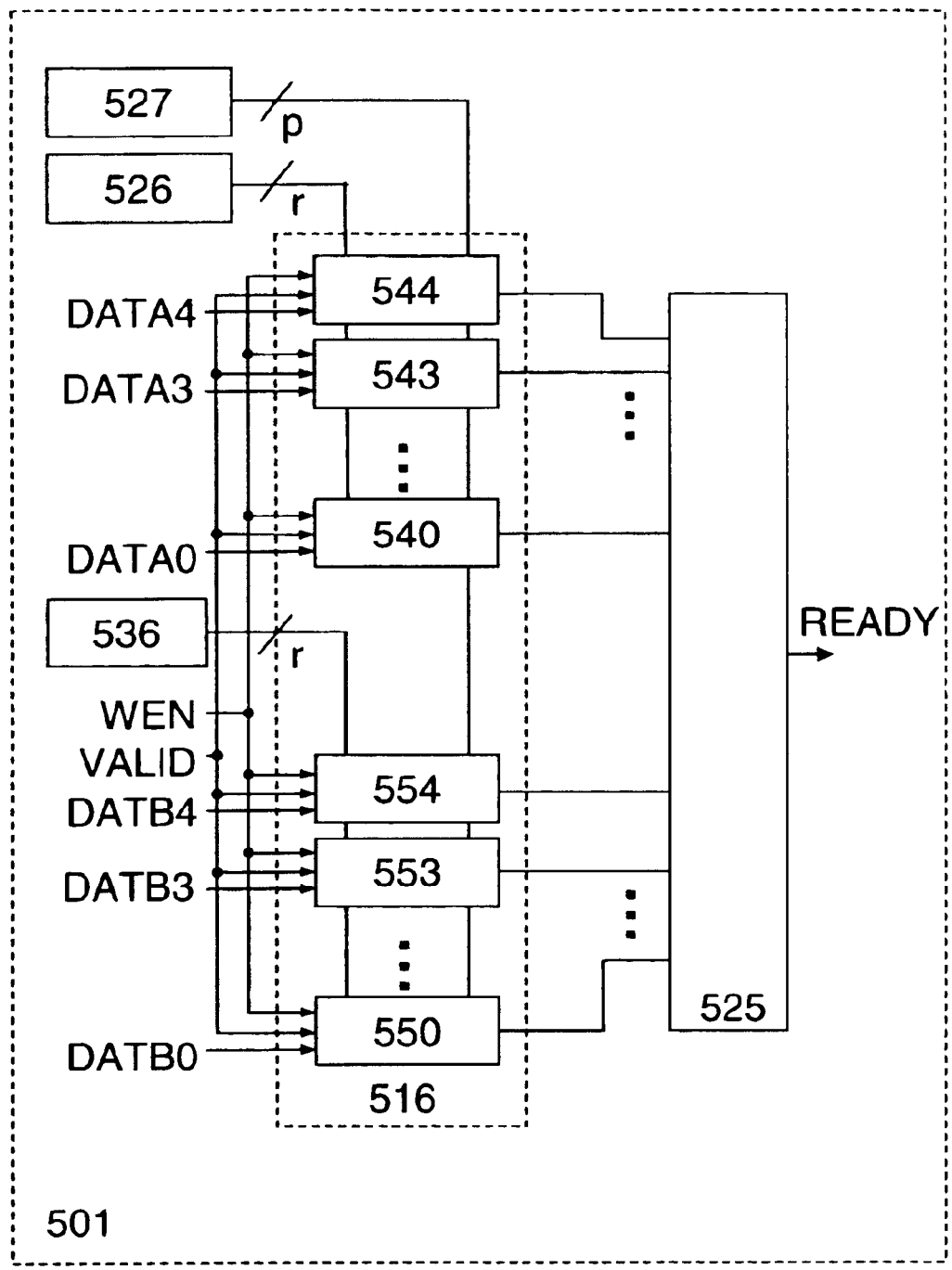
FIG. 5b illustrates another alternative embodiment of the apparatus to check for dependencies and to signal when an instruction is ready for dispatch.

FIG. 5b illustrates another alternative embodiment of an apparatus 501 to check for dependencies using dependency match logic 516 and dependency checking logic 525 and to signal by asserting READY when an instruction is ready for dispatch. Dependency match logic 516, comprising dependency match logic 544, 543, . . . and 540, receives, for a corresponding instruction, a first pair of dependency coordinates including a coordinate comprising r bits from buffer select 526 and a coordinate comprising DATA4, DATA3, . . . and DATA0. Dependency match logic 516, further comprising dependency match logic 554, 553, . . . and 550, also receives, for the corresponding instruction, a second pair of dependency coordinates including a coordinate comprising r bits from buffer select 536 and a coordinate comprising DATB4, DATB3, . . . and DATB0. If the VALID signal and the WEN (write enable) signal are concurrently asserted as inputs to dependency match logic 516, then dependency match logic 516 may record the coordinate comprising DATA4, DATA3, . . . and DATA0 and the coordinate comprising DATB4, DATB3, . . . and DATB0.

Dependency match logic 516 may also receive p-bit scheduling information pertaining to dispatched instructions from interface 527. If the scheduling information from interface 527 matches the first pair of dependency coordinates, then the coordinate comprising DATA4, DATA3, . . . and DATA0 may be cleared by dependency match logic 516. If the scheduling information from interface 527 matches the second pair of dependency coordinates, then the coordinate comprising DATB4, DATB3, . . . and DATB0 may be cleared by dependency match logic 516. Either or both coordinates may be cleared in the same cycle that WEN is asserted.

Dependency checking logic 525 receives an indicator from dependency match logic 516 of whether a dependency precludes scheduling of the corresponding instruction and produces a READY signal to identify the instruction for scheduling when no such dependency is indicated.

Figure 6A:
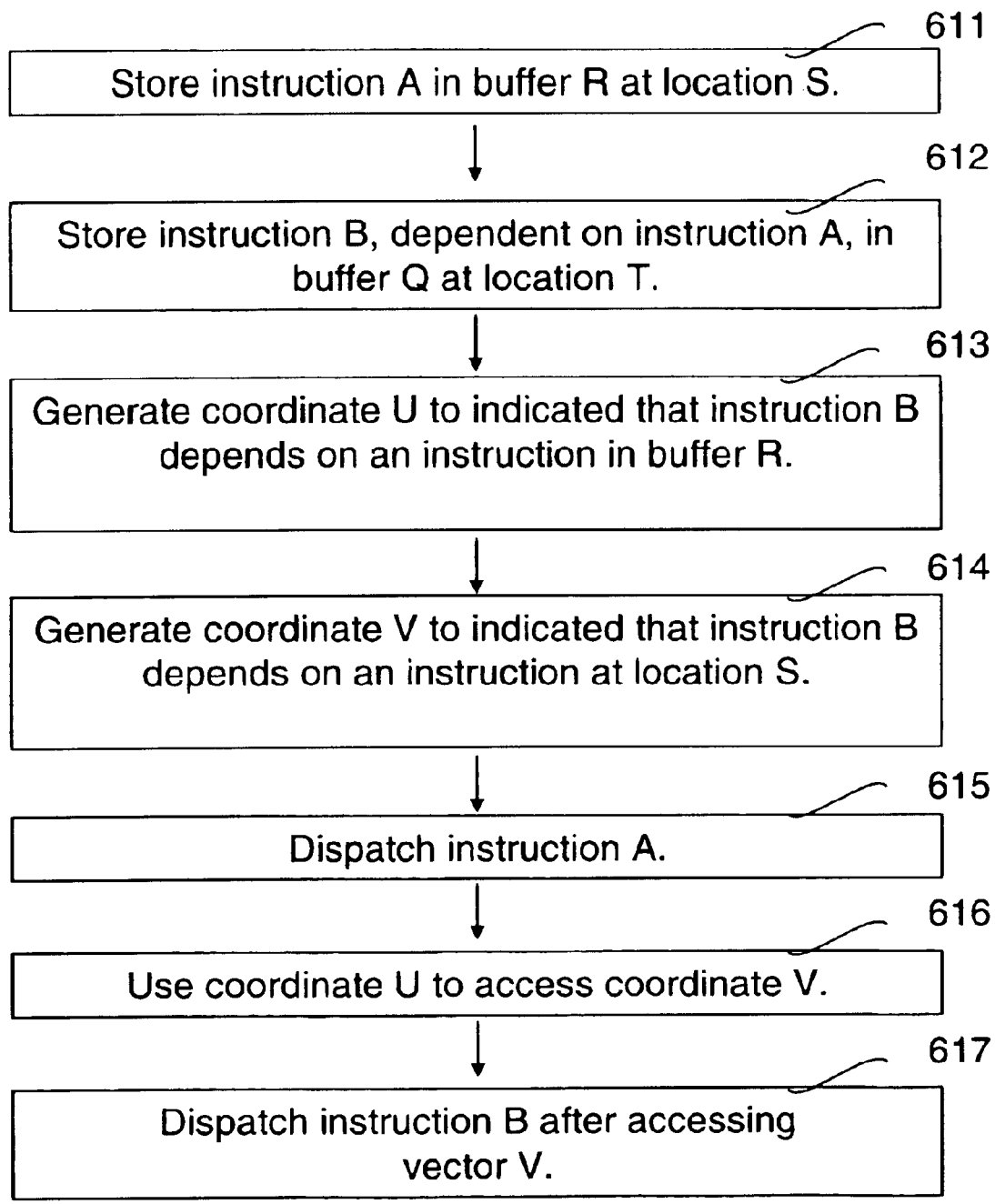
FIG. 6a illustrates one embodiment of a process to record a dependency and to match scheduled instructions with dependencies.

FIG. 6a illustrates a diagram of one embodiment of a process to record a dependency and to match scheduled instructions with dependencies. The process is performed by processing blocks that may comprise software or firmware operation codes executable by general purpose machines or by special purpose machines or by a combination of both.

The process diagram begins in processing block 611 with the storing of an instruction, A, in a buffer, R, at storage location S. Processing continues in processing block 612 with the storing of an instruction, B, dependent on instruction A, in a buffer, Q, at storage location T. It will be appreciated that while instruction B may be different than instruction A, buffer R may be the same as buffer Q, or that S may refer to the same storage location in buffer R as T refers to in buffer Q. It will also be appreciated that the processing, for example of processing block 611 and processing block 612 may take place concurrently or in either order, particularly in an OOO processor.

Now turning to processing block 613, a coordinate, U, is generated to indicate that instruction B depends on an instruction in a buffer referred to by R. In processing block 614, a coordinate V is generated to indicate that the instruction B depends on and instruction at a storage location referred to by S.

Processing continues in processing block 615, with the dispatching of instruction A. In processing block 616, the coordinate, U, is used to access the coordinate, V. Then, following after the access of coordinate V, instruction B is dispatched in processing block 617.

It will be appreciated that one skilled in the art may use the techniques taught herein, and use the coordinate V instead, to access the coordinate U without departing from the broader spirit and scope of the invention. Accordingly, the diagrams disclosed herein are to be regarded in an illustrative rather than restrictive sense and the invention measured only in terms of the accompanying claims.

Figure 6B:
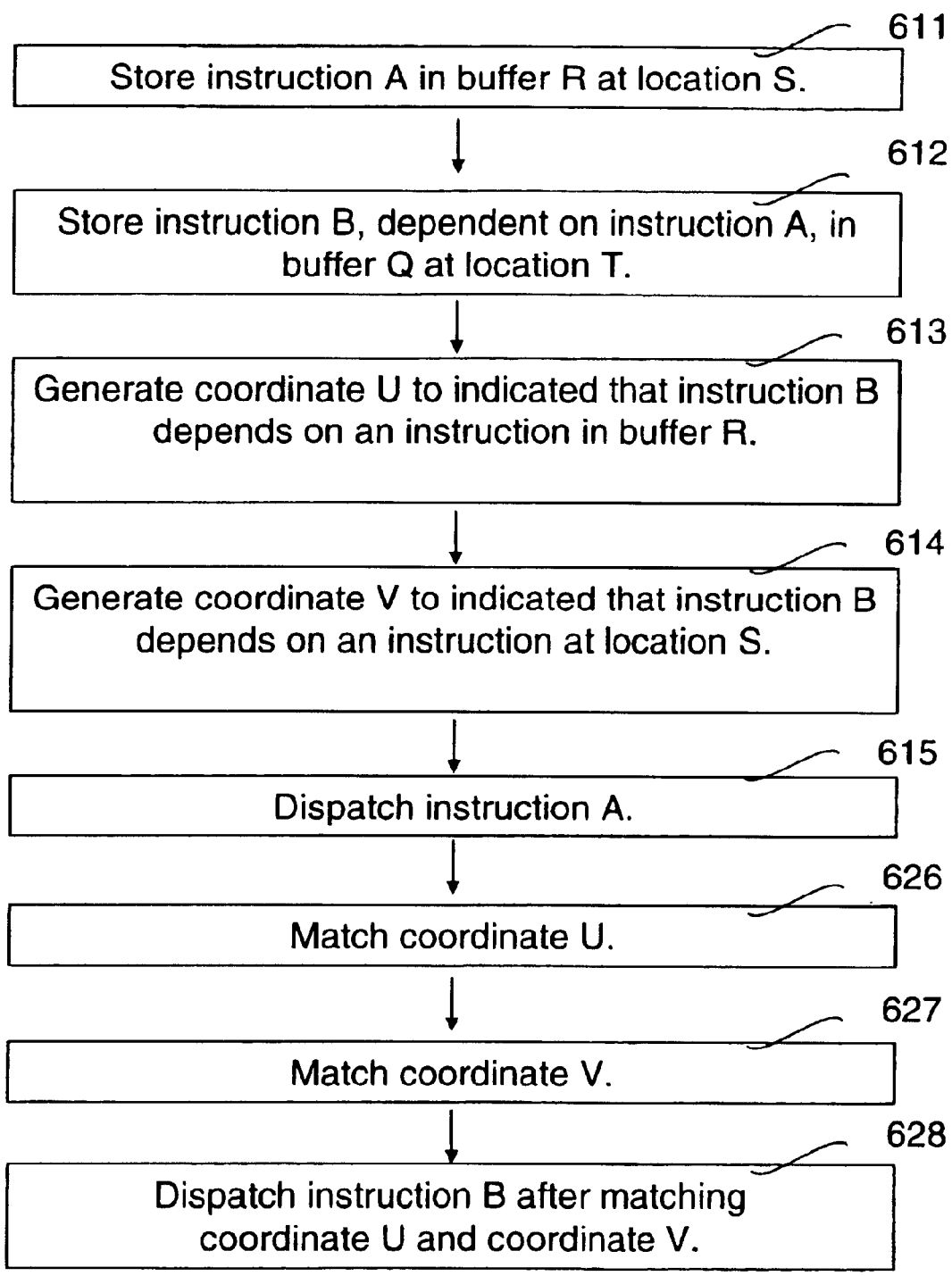
FIG. 6b illustrates an alternative embodiment of the process to record a dependency and to match scheduled instructions with dependencies.

FIG. 6b illustrates a diagram of an alternative embodiment of a process to record a dependency and to match scheduled instructions with dependencies. The process diagram begins again in processing block 611 with the storing of an instruction, A, in a buffer, R, at storage location S. Processing continues in processing block 612 with the storing of an instruction, B, dependent on instruction A, in a buffer, Q, at storage location T. As before, in processing block 613, a coordinate, U, is generated to indicate that instruction B depends on an instruction in a buffer referred to by R, and in processing block 614, a coordinate V is generated to indicate that the instruction B depends on and instruction at a storage location referred to by S.

Processing continues in processing block 615, with the dispatching of instruction A. In processing block 626, coordinate U is matched, and in processing block 627 coordinate V is matched. Then, following after the matching of coordinate U and coordinate V, instruction B is dispatched in processing block 628.

Figure 7:
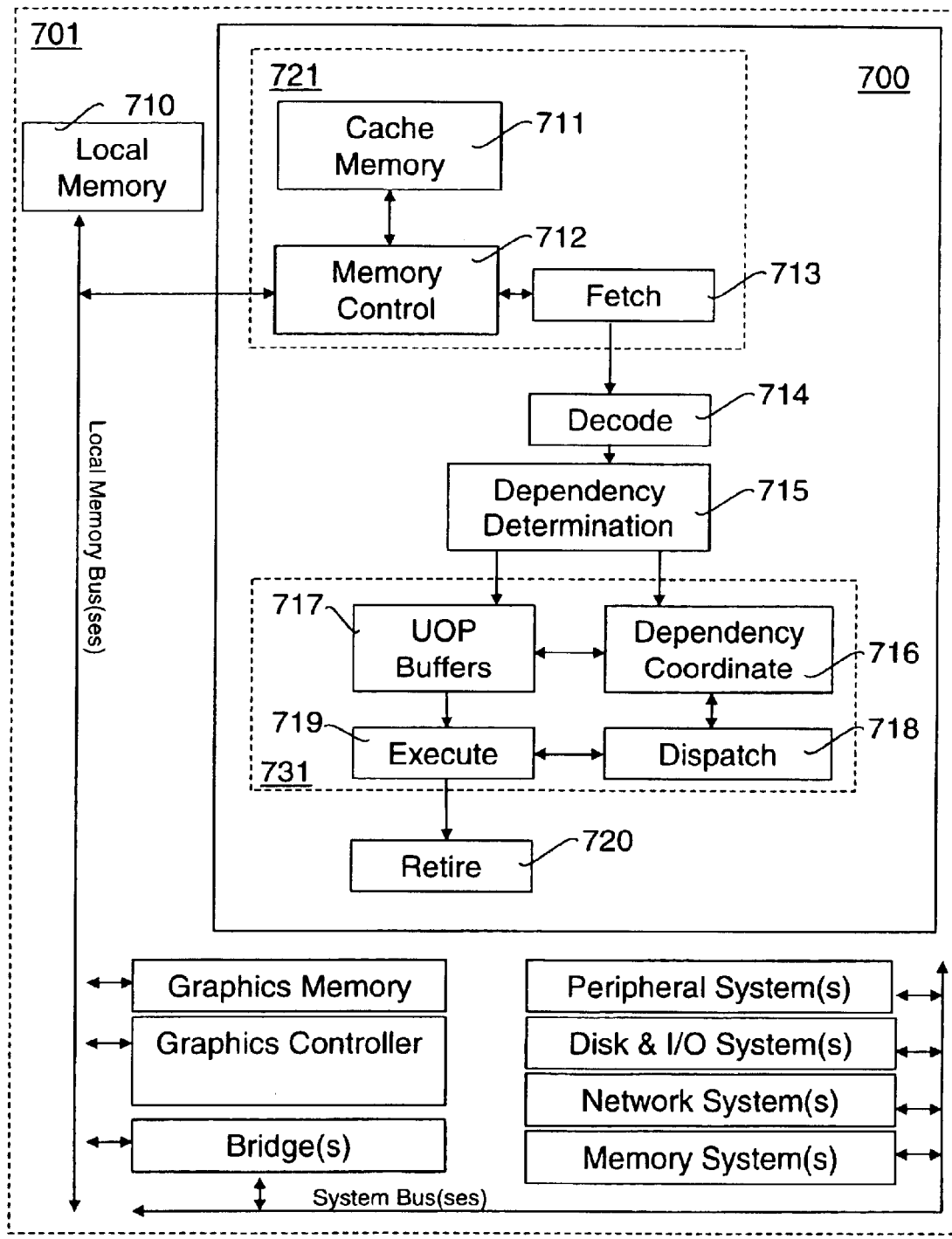
FIG. 7 illustrates one embodiment of a computing system including a processor that uses dependency coordinate matching.

FIG. 7 illustrates one embodiment of a computing system 700 including central processing unit 701 that uses dependency coordinate matching.

In processing block 721, instructions (typically macro-instructions, micro-instructions or emulation instructions) may be fetched from local memory 710 or from cache memory 711 by fetch logic 713 through memory control logic 712.

Decode logic 714 receives instructions from fetch logic 713 and is coupled with dependency determination logic 715 to provide decoded instructions (typically micro-instructions, micro-operations or emulation operations) and dependency information to processing block 731.

In processing block 731, instructions are stored in UOP buffers 717 and dependency coordinates are provided to dependency coordinate logic 716 for matching to dispatched instructions. Instructions in UOP buffers 717 may be dispatched for execution to execute logic 719 by dispatch logic 718 when they have been identified as ready for scheduling by dependency coordinate logic 716. After completing execution, instructions are provided to retire logic 720 to be retired and, if necessary, reordered.

In one embodiment of system 700, central processing unit 701 supports most or all of the instructions supported by any one of the Intel Pentium® 4, Intel Pentium® III Xeon™, Intel Pentium® III, Intel Celeron™, Intel Pentium® II Xeon™, Intel Pentium® II, and Pentium® Pro processors; the Pentium® processor with MMX™ technology; the Pentium® processor; and the Intel486™, Intel386™, Intel 286, and Intel 8086 processors; all available from Intel Corporation of Santa Clara, Calif. In another embodiment of system 700, central processing unit 701 supports all the operations supported in the IA-32 Intel® Architecture, as defined by Intel Corporation of Santa Clara, Calif. (see *IA-32 Intel® Architecture Software Developer's Manual*, volume 1 and volume 2, 2000, available from Intel of Santa Clara, Calif.).

In another embodiment of system 700, central processing unit 701 supports most or all of the instructions supported by any one of the Intel Itanium™ processors, available from Intel Corporation of Santa Clara, Calif. In another embodiment of system 700, central processing unit 701 supports all the instructions supported by any one of the PowerPC™ processors, available from Motorola of Schaumburg, Ill. or from IBM of Armonk, N.Y. In another embodiment of system 700, central processing unit 701 supports all the instructions supported by any one of the PA-RISC™ processors, available from Hewlett-Packard of Palo Alto, Calif. In another embodiment of system 700, central processing unit 701 supports all the instructions supported by any one of the Sun SPARC™, UltraSPARC™, and MicroSPARC™, processors, available from Sun Microsytems of Palo Alto, Calif. In another embodiment of system 700, central processing unit 701 supports all the instructions supported by one or more current processors, not limited to the processors noted above. In addition the system 700, specifically central processing unit 701 can be modified to incorporate future instructions.

Computing system 700 may comprise a personal computer, workstation or server including but not limited to central processing unit 701, graphics memory, graphics controller(s), and local memory 710; system bus(ses), local bus(ses) and bridge(s); peripheral systems, disk and input/output systems, network systems and memory systems.

The above description is intended to illustrate preferred embodiments of the present invention. From the discussion above it should also be apparent that the invention may be modified in arrangement and detail by those skilled in the art without departing from the principles of the present invention within the scope of the accompanying claims.

What is claimed is:

1. An apparatus comprising:
    dependency matching logic to receive a first dependency coordinate and a second dependency coordinate corresponding to a single dependency relationship, the dependency matching logic, upon receiving the first and second dependency coordinates, to identify whether the dependency precludes scheduling; and
    dependency checking logic to produce a ready signal if the dependency matching logic has not identified that scheduling is precluded.

2. The apparatus of claim 1 wherein the first dependency coordinate identifies a first buffer of a plurality of buffers.

3. The apparatus of claim 2 wherein the second dependency coordinate identifies a first location within the first buffer.

4. The apparatus of claim 2 wherein the first dependency coordinate identifies a buffer in an arrangement selected from the group of a hierarchical buffer arrangement, a functional buffer arrangement, and a symmetric buffer arrangement.

5. The apparatus of claim 1 further comprising:
    a scheduling information interface to transmit, to the dependency matching logic, a dispatch signal pertaining to an instruction being dispatched, the dependency matching logic, upon receiving the dispatch signal to identify whether the first dependency precludes scheduling by matching the dispatch signal to the first and second dependency coordinates.

6. The apparatus of claim 5 further comprising:
    a write-enable input to transmit, to the dependency matching logic, a write-enable signal to enable the dependency matching logic to store the second dependency coordinate.

7. The apparatus of claim 6 wherein the dependency matching logic, upon receiving the dispatch signal is to identify whether the first dependency precludes scheduling by clearing the second dependency coordinate.

8. The apparatus of claim 7 wherein the dependency matching logic, upon receiving the dispatch signal is enabled to clear the second dependency coordinate while receiving the write-enable signal.

9. A method for scheduling an instruction for execution comprising:
    generating a first dependency coordinate to indicate that a second instruction is dependent on a first instruction;
    generating a second dependency coordinate to indicate that the second instruction is dependent on the first instruction;
    dispatching the first instruction for execution;
    using the first dependency coordinate to access the second dependency coordinate in response to the first instruction being dispatched; and
    dispatching the second instruction after accessing the second dependency coordinate.

10. The method of claim 9 further comprising:
    storing the first instruction in a first location corresponding to second dependency coordinate within a first buffer.

11. The method of claim 10 wherein the first dependency coordinate indicates that the first instruction is stored in the first buffer.

12. An article of manufacture comprising
    a machine-accessible medium including data that, when accessed by a machine, cause the machine to perform the method of claim 11.

13. A method for scheduling an instruction for execution comprising:
    storing a first instruction in a first location within a first buffer;
    storing a second instruction, dependent on the first instruction, in a second location within a second buffer;
    generating a first dependency coordinate for the second instruction to indicate that the second instruction is dependent on an instruction stored in the first buffer; and
    generating a second dependency coordinate for the second instruction to indicate that the second instruction is dependent on an instruction stored in the first location.

14. The method of claim 13 further comprising:
    dispatching the first instruction for execution;
    matching the first dependency coordinate to a dispatch from the first buffer in response to the first instruction being dispatched;

matching the second dependency coordinate to a dispatch from the first location in response to the first instruction being dispatched; and dispatching the second instruction after matching the first dependency coordinate and the second dependency coordinate.

15. A dependency matching logic comprising:

a first storage location to store a first dependency coordinate referencing one of a plurality of operation buffers;

a second storage location to store a second dependency coordinate referencing a location of a plurality of addressable locations in an operation buffer;

an interface to receive an indication of a first scheduled operation, the dependency matching logic, upon receiving the indication of the first scheduled operation, to identify whether the first scheduled operation corresponds to the location referenced by the second dependency coordinate in the buffer referenced by the first dependency coordinate.

16. The apparatus of claim 15 further comprising:

a write-enable input to transmit, to the dependency matching logic, a write-enable signal to enable the dependency matching logic to store the second dependency coordinate.

17. The apparatus of claim 16 wherein the dependency matching logic, is to clear the second dependency coordinate responsive to identifying that the first scheduled operation corresponds to the location referenced by the second dependency coordinate in the buffer referenced by the first dependency coordinate.

18. The apparatus of claim 17 wherein the dependency matching logic, responsive to identifying that the first scheduled operation corresponds to the location referenced by the second dependency coordinate in the buffer referenced by the first dependency coordinate is enabled to clear the second dependency coordinate concurrent with the receiving of the write-enable signal.

19. A dependency matching logic comprising:

means for storing a first dependency coordinate referencing one of a plurality of operation buffers;

means for storing a second dependency coordinate referencing a location of a plurality of addressable locations in an operation buffer;

means for receiving an indication of a first scheduled operation; and means for identifying whether the first scheduled operation corresponds to the location referenced by the second dependency coordinate in the buffer referenced by the first dependency coordinate.

20. The apparatus of claim 19 further comprising:

means for clearing the second dependency coordinate concurrent with the cycle in which it is received for storing.

21. An article of manufacture comprising:

a machine-accessible medium including data that, when accessed by a machine, cause the machine to:

generate a first dependency coordinate for a first instruction to indicate that the first instruction is dependent on an instruction stored in a first buffer;

generate a second dependency coordinate for the first instruction to indicate that the first instruction is dependent on an instruction stored in a first location in a buffer;

match the first dependency coordinate to a dispatching of a second instruction from the first buffer;

match the second dependency coordinate to a dispatching of the second instruction from the first location in the first buffer; and dispatch the second instruction after matching the first dependency coordinate and the second dependency coordinate.

22. A computing system comprising:

dependency coordinate logic to store a first dependency coordinate referencing one of a plurality of operation buffers and a second dependency coordinate referencing a location of a plurality of addressable locations in an operation buffer;

dispatch logic coupled to the dependency coordinate logic to send an indication of a first scheduled operation;

dependency match logic to identify whether the first scheduled operation corresponds to the location referenced by the second dependency coordinate in the buffer referenced by the first dependency coordinate.

23. The computing system of claim 21 further comprising:

fetch logic to receive a first instruction from a first memory; and decode logic coupled with the fetch logic to translate the first instruction into at least one operation to be stored in one or more of the plurality of addressable locations in the operation buffer.

24. The computing system of claim 22 wherein the decode logic comprises an integrated circuit.

25. The computing system of claim 22 wherein the decode logic comprises a combination of an integrated circuit and emulation data.

26. The computing system of claim 22 wherein the first instruction comprises an emulation instruction.

27. The computing system of claim 22 wherein the first instruction comprises a macro-instruction.

28. The computing system of claim 26 wherein the at least one or operation comprises a micro-operation.

29. The computing system of claim 26 wherein the at least one operation comprises an emulation instruction.

* * * * *